United States Patent
Hahn et al.

(10) Patent No.: US 6,377,443 B1
(45) Date of Patent: Apr. 23, 2002

(54) THERMAL TREATMENT PROCESS FOR VALVE METAL NITRIDE ELECTROLYTIC CAPACITORS HAVING MANGANESE OXIDE CATHODES

(75) Inventors: Randolph S. Hahn, Simpsonville; Brian J. Melody, Greer; John T. Kinard, Simpsonville; David A. Wheeler, Williamston, all of SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 0 days.

(21) Appl. No.: 09/766,583

(22) Filed: Jan. 23, 2001

Related U.S. Application Data

(63) Continuation of application No. 09/578,716, filed on May 26, 2000, now Pat. No. 6,214,271.

(51) Int. Cl.[7] .................................................. H01G 9/04
(52) U.S. Cl. ...................... 361/508; 361/528; 264/234; 427/79; 427/80
(58) Field of Search .............................. 361/509, 528, 361/529, 508; 29/25.03; 264/234; 427/79.8

(56) References Cited

U.S. PATENT DOCUMENTS

| | | |
|---|---|---|
| 3,217,381 A | 11/1965 | Wessling |
| 3,302,074 A | 1/1967 | Black |
| 3,337,429 A | 8/1967 | Zind |
| 3,614,544 A * | 10/1971 | Mosebach et al. .......... 361/524 |
| 4,269,691 A | 5/1981 | Deborski |
| 4,652,463 A | 3/1987 | Peters |
| 5,254,137 A * | 10/1993 | Toshiyuki .......... 148/DIG. 138 |
| 5,622,746 A | 4/1997 | Hahn et al. |
| 6,512,652 * | 4/2001 | Yoshida et al. ............ 29/25.03 |

FOREIGN PATENT DOCUMENTS

| | | |
|---|---|---|
| DE | 2 256 739 | 6/1974 |
| JP | 60086029 | 5/1985 |
| RO | 106871 | 7/1993 |

OTHER PUBLICATIONS

Electrochemical Society, 2nd Manganese Dioxide Synposium 1980, Electrical and Physical Properties of $MnO_2$ Layer For The High Performance Tanalum Solid Electrolytic Capacitor, Published 1981.

J. Electrochemical Society, P.H. Klose, "Electrical Properties of Managese Dioxide and Manganese Sesquioxide", Jul. 1970.

* cited by examiner

*Primary Examiner*—Anthony Dinkins
(74) *Attorney, Agent, or Firm*—Banner & Witcoff, Ltd.

(57) ABSTRACT

An electrolytic capacitor comprising a thermally treated anode prepared by heating a manganese dioxide coated porous anodized valve metal nitride anode to a temperature of about 325° C. to about 450° C. The anode may be heated to first temperature of about 200° C. to about 250° C. for a time sufficient for the valve metal nitride anode to reach thermal equilibrium, prior to increasing the temperature to about 325° C. to about 450° C.

16 Claims, 5 Drawing Sheets

THERMAL TREATMENT PROCESS FOR VALVE METAL NITRIDE ELECTROLYTIC CAPACITORS HAVING MANGANESE OXIDE CATHODES

This application is a continuation of Ser. No. 09/578,716, filed May 26, 2000 now U.S. Pat. No. 6,214,271.

FIELD OF THE INVENTION

A thermal treatment process to increase the conductivity of pyrolytic manganese dioxide coatings for valve metal nitride electrolytic capacitors.

BACKGROUND OF THE INVENTION

Manganese dioxide coatings on both internal and external surfaces of anodized electrolytic capacitor anodes serve as the cathode for most commercially available "solid" capacitors. Typically, powdered tantalum or other suitable valve metal is pressed and sintered to form a porous anode body which serves as the anode. Other suitable valve metals include titanium, niobium, zirconium, aluminum, hafnium, tungsten, or mixtures, alloys, or metallic-glass compositions of these metals. A capacitor dielectric is then formed by electrolytic oxidation of the surfaces of the porous anode body. A semiconductor manganese dioxide coating is then deposited upon these surfaces to serve as the cathode in the electrolytic capacitor construction.

The manganese dioxide coating is typically produced by dipping the anodized anodes in an aqueous manganous nitrate solution followed by pyrolytic decomposition of the manganous nitrate to manganese dioxide in an oven, usually at a temperature of 130–270° C., for sufficient time to substantially complete the pyrolytic conversion of the manganous nitrate. This process is repeated several times using various manganous nitrate concentrations to form a semiconducting film providing adequate coverage of all anode surfaces.

Modern electronics circuits employing capacitors function most efficiently with capacitors having relatively low equivalent series resistance (ESR) and dissipation factor (df). In order to produce electrolytic capacitors containing manganese dioxide cathodes and having relatively low ESR and df, it is important that the capacitors contain highly conductive manganese dioxide.

Manganese dioxide, both naturally occurring and synthetic, is a complex substance which occurs in a variety of crystal forms, densities, hydration states, and metal/oxygen stoichiometries. These differences impact the electrical conductivity of manganese dioxide to a marked degree. Generally speaking, the most conductive material appears to be the beta crystal form, which also has the highest density and lowest water content, and is closest to true $MnO_2$ stoichiometry.

Capacitor manufacturers have attempted to maximize the electrical conductivity of pyrolytic manganese dioxide by optimizing the manganous nitrate specific gravity dip sequence, oven temperature, and the composition of the oven atmosphere. A process for injecting steam into a conversion oven was described in U.S. Pat. Nos. 3,337,429. 5,622,746 describes a process for producing high conductivity pyrolytic manganese dioxide coatings by injecting highly oxidizing species, such as nitric acid or ozone, into the pyrolysis oven. However with nitric acid injection, control of the atmosphere is difficult, pyrolysis oven redesign is necessary to limit the volumes of nitric acid required, and the acidic atmosphere tends to cause the manganous nitrate to splatter, depositing $MnO_2$ on the capacitor positive lead. It is also desirable from an environmental standpoint to avoid the generation of excess $NO_2$ gases which result from the decomposition of the additional nitric acid injected into the pyrolysis oven.

U.S. Pat. Nos. 4,038,159 and 4,042,420 disclose highly conductive manganese dioxide coatings on tantalum capacitors produced through the thermal decomposition of aqueous manganous nitrate solutions in a small, positive pressure, radiant energy oven. However, there is still the problem of manganous nitrate splatter with small, positive pressure radiant furnaces. See, for example, U.S. Pat. No. 4,038,159, column 5, lines 44–52.

U.S. Pat. No. 3,801,479 describes a method for incorporating electrolytic manganese dioxide into a tantalum capacitor anode followed by a heat treatment or high temperature anodizing step to improve the leakage current of capacitors via restoration of stoichiometry of the tantalum oxide dielectric with oxygen from water released by the electrolytic manganese dioxide (FIG. 1 and equation 7, line 14, column 5).

The literature of the tantalum capacitor industry generally describes the product of the pyrolytic decomposition of manganous nitrate as beta-$MnO_2$. Wiley, et. al. describes the pyrolytic conversion of manganous nitrate in test tubes to form manganese dioxide in the paper entitled "The Electrical Resistivity of Pyrolytic Beta $MnO_2$," *Journal of the Electrochemical Society*, Vol. 111, June 1964. The authors indicate that x-ray diffraction patterns of the samples produced were consistent with beta-$MnO_2$. The resistivities of the samples produced were essentially constant for conversion temperatures between 150 and 370° C.

In a paper entitled "Electrical Properties of Manganese Dioxide and Manganese Sesquioxide," *Journal of the Electrochemical Society*, Vol. 117, No. 7, July 1970, Peter Klose describes manganese oxides produced by the pyrolytic decomposition of manganous nitrate in a variety of vessels. While Klose did not perform x-ray diffraction analysis of his samples, others in the literature routinely refer to them as beta-$MnO_2$ (e.g. E. Preisler, "Semiconductor Properties of Manganese Dioxide," *Journal of Applied Electrochemistry*, 6,311 (1976) and Jian-Bao Li, et. al., "Electrical Properties of Beta and Gamma Type Manganese (IV) Oxides," *Journal of the Ceramic Society of Japan*, 96, 74 (1988)). U.S. Pat. No. 3,801,479 describes manganese dioxide used in solid tantalum capacitors as beta-$MnO_2$.

In a paper entitled "Electrical and Physical Properties of $MnO_2$, Layer for the High Performance Tantalum Solid Electrolytic Capacitor", presented at the 2nd Manganese Dioxide Symposium in Tokyo in 1980, the researchers claim that the pyrolytic conversion of manganous nitrate in both forced convection and radiation furnaces result in beta-$MnO_2$ over a wide range of conversion temperatures (200 to 300° C.).

U.S. Pat. No. 3,801,479 describes the pyrolytic $MnO_2$ on tantalum capacitors as beta-$MnO_2$ (in FIG. 1 and in lines 46–49, column 3). This patent discloses the departure from stoichiometry produced in the anodic tantalum oxide by the pyrolysis process and exploits the resulting large dependence of the anodic oxide resistivity upon temperature to produce a uniform layer of electrolytic manganese dioxide on the pyrolized capacitor bodies from solutions containing manganese ions and maintained at a temperature between 50° C. and 99° C. (claim 7). The uniform currents required for the production of the electrolytic manganese dioxide layer are not obtained unless the anodic tantalum oxide stoichiometry is first disturbed by exposure to pyrolysis temperatures (lines 8–12, column 4). The leakage current of capacitors produced by the process described in U.S. Pat. No. 3,801,479 is reduced to produce high-quality capacitors by restoration of the anodic tantalum oxide stoichiometry via a heat treatment step during which the tantalum anode is externally biased neutral or positive (lines 31–33, column 5) to produce migration of oxygen to the tantalum oxide surface (equation 7, line 15, column 5). The importance of the application of voltage at temperatures above 110° C. is stressed in lines 62–71, column 7.

While beta-$MnO_2$ is formed by the pyrolytic decomposition of manganous nitrate in a test tube, unless special measures are taken to control the oven atmosphere, the primary product of the decomposition of manganous nitrate on tantalum capacitors is a form of $MnO_2$ referred to as gamma-$MnO_2$ or epsilon-$MnO_2$(ahktenskite). X-ray diffraction studies of pyrolytic manganese dioxide sample produced under a wide range of pyrolysis temperatures (130–330° C.) in various atmospheres (dry to 75% steam) indicate the less conductive forms of $MnO_2$ are the principle reaction product. Beta-$MnO_2$ is produced by the decomposition of manganous nitrate if nitric acid is injected into the oven atmosphere (U.S. Pat. No. 5,622,746). This process however is difficult to control, and it is desirable to avoid the introduction of concentrated nitric acid into a production environment.

E. Preisler ("Semiconductor Properties of Manganese Oxide," *Journal of Applied Electrochemistry*, 6,311 (1976) describes a heat treatment which transforms the properties of elecrodeposited manganese oxides from gamma-$MnO_2$ to beta-$MnO_2$. R. Giovanoli ("A Review of Structural Data of Electrolytical and Chemical $MnO_2$," 2nd $MnO_2$ Symposium in Tokyo (1980) reported that lattice transformations could be observed in gamma-$MnO_2$ chemically prepared from $Na_4Mn_{14}O_{27}*9H_2O$ by digestion in dilute nitric acid (CMD). Evidence of the lattice transformations were also observed in gamma-$MnO_2$ prepared by electrolytic methods (EMD). Jian-Bao Li, et al. ("Electrical Properties of Beta- and Gamma-Type Manganese (IV) Oxides," *Journal of the Ceramic Society of Japan*, 96, 74 (1988) describe the effect of various heat treatments on beta-$MnO_2$ and gamma-$MnO_2$. Gamma-$MnO_2$ samples exhibited minimum resistivity following heat treatment in the temperature range 350–400° C. Beta-$MnO_2$ exhibited small increases in resistivity following exposures to temperatures in excess of 150° C. Peter Klose ("Electrical Properties of Manganese Dioxide and Manganese Sesquioxide," *Journal Of The Electrochemical Society*, 111,656 (1960) also reports an increase in the resistivity of pyrolytic $MnO_2$ following exposure to temperatures in excess of 200° C. P. Fau, et al. ("Electrical Properties of Sputtered $MnO_2$ Thin Films," *Applied Surface Science*, 78, 203 (1994) describes a decrease in the resistivity of sputtered thin films of $MnO_2$, by air annealing at temperatures up to 450° C.

SUMMARY OF THE INVENTION

It is the object of the present invention to provide a low cost process for increasing the conductivity of pyrolytic manganese dioxide coatings for electrolytic capacitors.

It is a further object of this invention to provide a low cost method for producing capacitors which have low ESR.

It is still further object of the present invention to transform pyrolytic manganese dioxide produced by conventional pyrolysis ovens to a more conductive state in a single process step which avoids the problems of oven redesign, pyrolysis oven atmosphere control, acid injection, and manganous nitrate splatter.

It is still further an object of the present invention to produce highly conductive manganese dioxide coatings without resorting to a high temperature (e.g., 350–450° C.) pyrolysis process. Such processes tend to produce devices having elevated leakage current. Such processes also increase high energy related operating costs and render control of the oven temperature and temperature more difficult as capacitor anodes are introduced into and removed from the pyrolysis oven.

Consistent with these objectives, the invention relates to a process of preparing an electrolytic capacitor comprising heating a manganese dioxide coated porous anodized valve metal nitride anode to a temperature of about 325° C. to about 450° C. to produce a thermally treated anode.

The invention is further directed to a process of preparing an electrolytic capacitor comprising heating a manganese dioxide coated porous anodized valve metal nitride anode to a temperature of about 200° C. to about 250° C. for a time sufficient for the anodized valve metal nitride anode to reach thermal equilibrium, and then increasing the temperature to a temperature of about 325° C. to about 450° C. to produce a thermally treated anode. Preferably, thereafter, the oven temperature is reduced to 200–250° C. to reduce thermal shock of the anode.

The present invention is further directed to a process of preparing an electrolytic capacitor comprising impregnating a porous anodized valve metal nitride anode with an aqueous manganous nitrate solution; heating to a first temperature sufficient to cause pyrolytic decomposition of the manganous nitrate; repeating the impregnating and the heating to provide a manganese dioxide coated porous anodized valve metal nitride anode; and heating the coated porous valve metal nitride anode to a second temperature of about 325° C. to about 450° C. to produce a thermally treated anode.

DETAILED DESCRIPTION OF THE INVENTION

Figure 1:
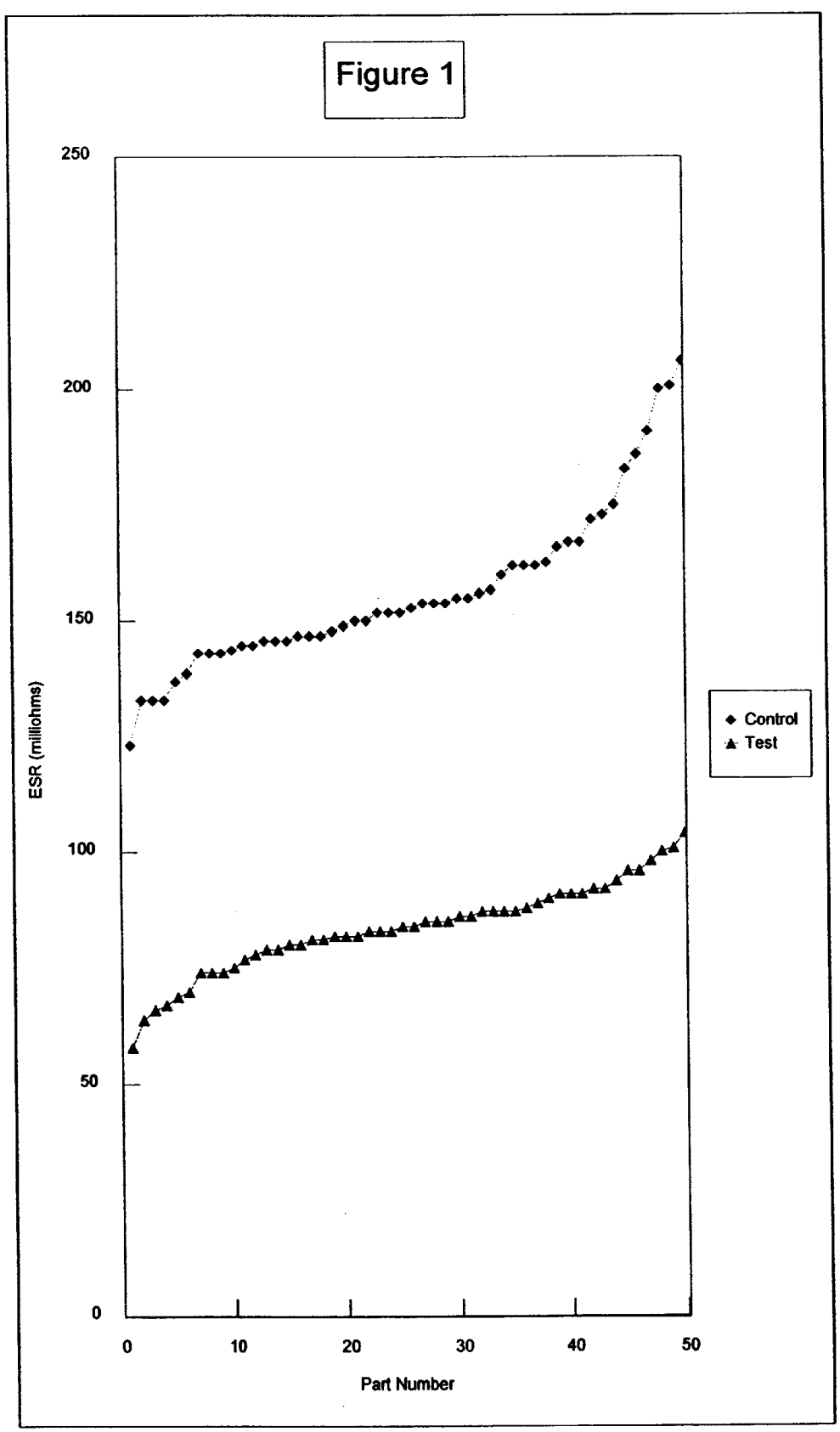
FIG. 1 illustrates the ESR performance of 47 $\mu F$ 10 volt anodes pressed from C300 Ta powder processed with and without a 400° C. 30 minute thermal treatment of the pyrolytic manganese dioxide.

Pyrolytic (manganese dioxide) $MnO_2$ samples not exposed to thermal treatment do not exhibit x-ray diffraction peaks exclusive to beta phase $MnO_2$. (Such peaks occur at a d-spacing of 3.11, 1.56, and 1.30 angstroms.) However, if such samples are exposed to 400° C. for various time periods, beta-$MnO_2$ is formed and peaks can be observed in each of the three locations on x-ray diffraction patterns. As the thermal treatment time is increased, the x-ray diffraction peaks attributed to beta-$MnO_2$, increase in intensity.

Anodic tantalum oxide prepared in the traditional manner (e.g. by anodizing in a phosphate solution at 60° C. to 90° C.) and heat treated for a short time (e.g. 15–60 minutes) at a temperature higher than that employed for subsequent pyrolysis of the manganous nitrate (for example, a post-anodizing heat-treatment temperature 350–400° C. and a manganous nitrate pyrolysis temperature of 225° C. to 275° C.) and then processed through a second anodizing step at or slightly below the original anodizing voltage, is resistant to the ionic migration leading to the non-stoichiometry observed in U.S. Pat. No. 3,801,479. Consequently, there is no need to expose the manganese dioxide impregnated anodes to voltage at high temperature to reduce leakage current via restoration of anodic oxide stoichiometry.

With a thermally stable anodic tantalum oxide having generally good dielectric properties, the few blister-like flaws in the tantalum oxide may be isolated by a low temperature "reform" process in which the anodes are immersed in an electrolyte, which may be at 30° C. or lower temperature, and a voltage of approximately 50% of the initial anodizing voltage is applied. Isolation of the flaws occurs via local heating of the conductive manganese dioxide to temperatures which convert this oxide to a lower oxide of substantially lower conductivity.

It was discovered that the manganese dioxide, produced on porous tantalum capacitor anode bodies via repeated dipping of the anode bodies in manganous nitrate solution followed by pyrolysis, may be increased in conductivity by heating the manganese dioxide-coated anodes to a temperature of approximately 400° C. for approximately 30 minutes. Shorter times may be used at higher temperatures and longer times at lower temperatures.

However, the method of producing anodic tantalum oxide which is stable throughout the manganous nitrate pyrolysis process (i.e., heat-treating of the anodic oxide at 350° C. to 400° C. followed by a second anodizing step) will not produce an anodic oxide on anodes fabricated from high surface area tantalum powders which is capable of withstanding the approximately 400° C. temperature required to convert the pyrolytic manganese dioxide to the beta structure. In fact, if the heat-treatment process between anodizing steps is carried-out at temperatures significantly above 400° C., the oxygen which diffuses into the substrate from the anodic oxide tends to diffuse into the bulk of the substrate rather than to just accumulate adjacent to the oxide layer. This leads to fires with the finely divided, high surface area modern tantalum powders rather than to increased film stability.

Thus limited to a heat-treatment temperature between anodizing steps of approximately 400° C., tantalum anodes which are subjected to a post manganous nitrate pyrolysis thermal treatment step to reduce device ESR are subject to increased leakage current, especially at elevated temperature (e.g., 85° C.). The elevated device leakage current associated with tantalum anodes which have been exposed to a thermal treatment process to reduce device ESR is more pronounced at higher device working voltages. Thus, while it is possible to manufacture tantalum capacitors rated 6 volts and less employing this process and having acceptable leakage current performance, 10 volt-rated devices are difficult to fabricate, and tantalum capacitors rated 16 volts and above fabricated with this ESR-reducing thermal treatment have unacceptably high leakage currents.

There is an inherent instability of the tantalum/anodic tantalum oxide system with respect to diffusion of oxygen from the anodic oxide into the tantalum substrate. This diffusion process tends to degrade tantalum capacitor performance by rendering the oxide progressively more conductive over time as a result of the non-stoichiometry resulting from oxygen diffusion. While the tantalum/anodic tantalum oxide system is more stable than the analogous metal/oxide systems of niobium, zirconium, titanium, and most other valve metals and alloys, the oxygen diffusion instability appears to be a major cause of device failures. It is this oxygen diffusion instability which necessitates the heat treatment (and second anodizing) step after anodizing to maintain low leakage current levels in tantalum capacitors impregnated with pyrolytic manganese dioxide, which severely limits the usefulness of the thermal treatment process for reducing device ESR, and which leads to device ignition in extreme cases of device failure.

The inherent instability of the tantalum/anodic tantalum oxide system has been addressed in a recent paper by Dr. Terrance Tripp, et. al. ("Tantalum Nitride: A New Substrate For Solid Tantalum Capacitors," presented at the 20th Capacitor and Resistor Technology Symposium on Mar. 9, 2000; pages 256–262 of the Symposium Proceedings). These authors have found that tantalum nitride powder may be substituted for tantalum powder in the fabrication of porous capacitor anode bodies. During the sintering process, approximately half of the nitrogen contained in the nitride, TaN, is driven-off, yielding sintered anode bodies composed of the subnitride, $Ta_2N$. Tripp et al. found that the anodes fabricated from tantalum nitride and anodized in dilute phosphoric acid were significantly more resistant to thermally-driven oxygen diffusion from the anodic oxide into the substrate than anodes fabricated from tantalum powder. This resistance to oxygen diffusion was demonstrated by determining the dependence of capacitance upon applied positive anode bias following a 400° C. heat treatment. Anodized tantalum anodes were found to exhibit a strong dependence of capacitance upon positive anode bias following a 400° C. heat treatment step, indicating significant oxygen diffusion had occurred. Anodized tantalum nitride anodes were found to exhibit almost no positive anode bias dependence of capacitance following a 400° C. heat-treatment, indicating that no significant amount of oxygen diffusion had taken place (Tripp et. al., FIG. 6).

Tripp, et. al., also demonstrated a similar stabilization for the niobium/anodic niobium oxide system by substituting niobium nitride powder for niobium powder in the fabrication of porous powder metallurgy anodes. Again, this was demonstrated by capacitance versus positive anode bias testing of heat-treated, anodized anodes (FIG. 9, Tripp, et. al.)

The present invention provides a method for increasing the electrical conductivity of pyrolytic manganese dioxide coatings on electrolytic capacitors. Suitable, anodized porous valve metal nitride electrolytic capacitor anodes are impregnated with aqueous manganous nitrate solution, then heated in an oven to a temperature sufficient to cause pyrolytic decomposition of the manganous nitrate to produce manganese dioxide; generally from about 130° C. to about 300° C., preferably about 230° C. to about 270° C. The impregnation and pyrolysis process cycle is repeated several times so as to produce a substantially complete coating of manganese dioxide on both the internal and external surfaces of the porous valve metal nitride anode bodies.

The manganese dioxide-coated anode bodies are then placed in an oven and heated to a temperature from about 325° C. to about 450° C., preferably about 375° C. to about 400° C. and are held at this temperature for a period of time ranging from 15 seconds to 24 hours, preferably about 15 minutes to about 60 minutes.

In a preferred embodiment of the present invention, anodized porous valve metal nitride anode bodies fabricated from valve metal nitride materials and coated with pyrolytic manganese dioxide are preheated in, for example, a circulating air oven at a temperature of about 200° C. to about 250° C. and allowed to reach thermal equilibrium with the oven temperature. The oven temperature is then increased to 325° C. to about 450° C. and held at this temperature for a time sufficient to thermally treat the anode. The oven temperature is then reduced to about 200° C. to about 250° C. prior to removing the thermally treated anodes in order to minimize thermal shock to the capacitor anode bodies.

During the thermal treatment process, gamma- and/or epsilon-manganese dioxide produced by the pyrolysis process is converted to beta-manganese dioxide. The electrical conductivity of beta-manganese dioxide is significantly higher than that of gamma-manganese dioxide or epsilon-manganese dioxide. Thus the phase transformation which occurs in the pyrolytic manganese dioxide during the thermal treatment process results in a more conductive cathode material and greatly reduced device ESR and df.

A suitable valve metal nitride or sub-nitride is pressed and sintered to form a porous anode body which serves as the anode. Hereinafter, the term "nitride" is used to mean both nitrides and sub-nitrides. Preferably the valve metal nitride is tantalum nitride. Other suitable valve metal nitrides include titanium nitride, niobium nitride, zirconium nitride, hafnium nitride, tungsten nitride, or mixtures, alloys, or metallic-glass compositions of these metals. The use of valve metal nitride anodes gives rise to more thermally stable anodic oxide films.

Although not wishing to be limited by any theory, it is believed that more thermally stable anodic oxide films are a result of the very low rate of oxygen diffusion from the anodic oxide films into the nitride substrates compared with the relatively high rate of oxygen diffusion from anodic oxide films into such valve metal substrates as tantalum, niobium, or titanium. The anodes having the thermally stable anodic oxide films are capable of withstanding the temperatures employed in the thermal treatment process without the large increases in finished device leakage current which result from application of the thermal treatment process to manganese dioxide-containing anodes fabricated from traditional (i.e., non-nitride) valve metal powders. The process results in a manganese dioxide phase transformation which increases the conductivity of internal and external manganese dioxide coatings, resulting in a significant reduction in device ESR (equivalent series resistance).

EXAMPLES

Examples 1–4 illustrate the effectiveness of the thermal treatment process in reducing the equivalent series resistance (ESR) of solid tantalum capacitors coated with pyrolytic manganese dioxide using methods common in the industry. Anode lots were split into test and control groups following the final manganous nitrate pyrolysis step. Test groups were exposed to a thermal treatment step and serialized. Test and control groups were subsequently combined and processed through the carbon and silver paint application steps in order to facilitate measurement of the device electrical characteristics.

Example 1 (Comparative)

One group of 47 $\mu$F 10 volt anodes pressed from Cabot C300 Ta powder (test group) was placed in an oven at 400° C. The oven temperature was maintained at this level for 30 minutes prior to removing the anodes from the oven. The group exposed to the thermal treatment exhibited a 46% reduction in ESR relative to the control group. The results are depicted in FIG. 1.

Example 2 (Comparative)

Figure 2:
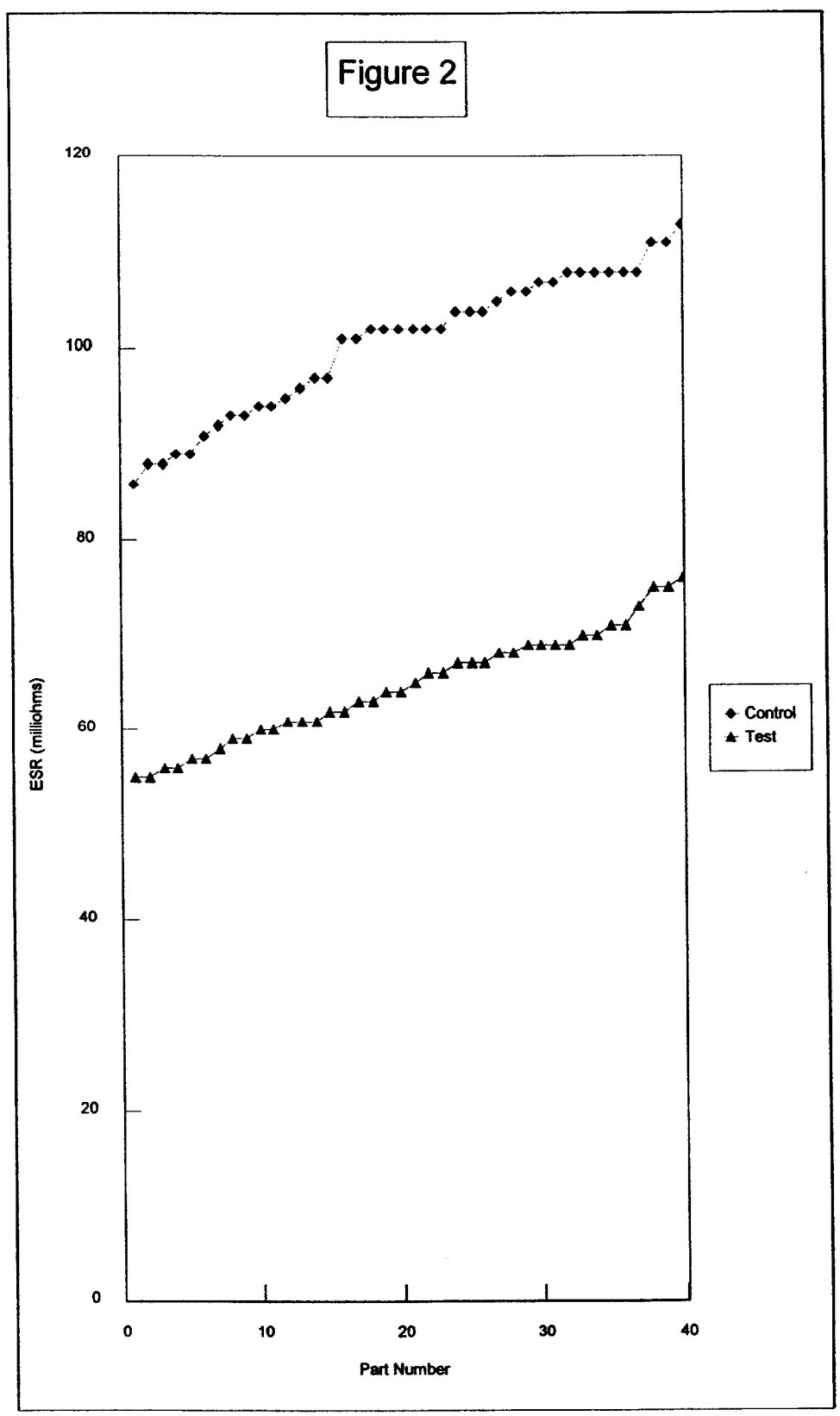
FIG. 2 illustrates the ESR of 100 $\mu F$ 6 volt anodes pressed from C300 Ta powder processed with and without a ramped 400° C. 30 minute thermal treatment of the pyrolytic manganese dioxide.

One group of 100 $\mu$F 6 volt anodes pressed from Cabot C300 Ta powder (test group) was placed in an oven at 250° C. The oven temperature was maintained at this level for 2 minutes to allow the anodes to stabilize. The oven was ramped to 400° C. (approximately ramp time 9 minutes) followed by a 30 minute soak at this temperature. The oven was subsequently allowed to cool to 250° C. prior to removing the anodes from the oven. The group exposed to the thermal treatment exhibited a 36% reduction in ESR relative to the control group. The results are depicted in FIG. 2.

Example 3 (Comparative)

Figure 3:
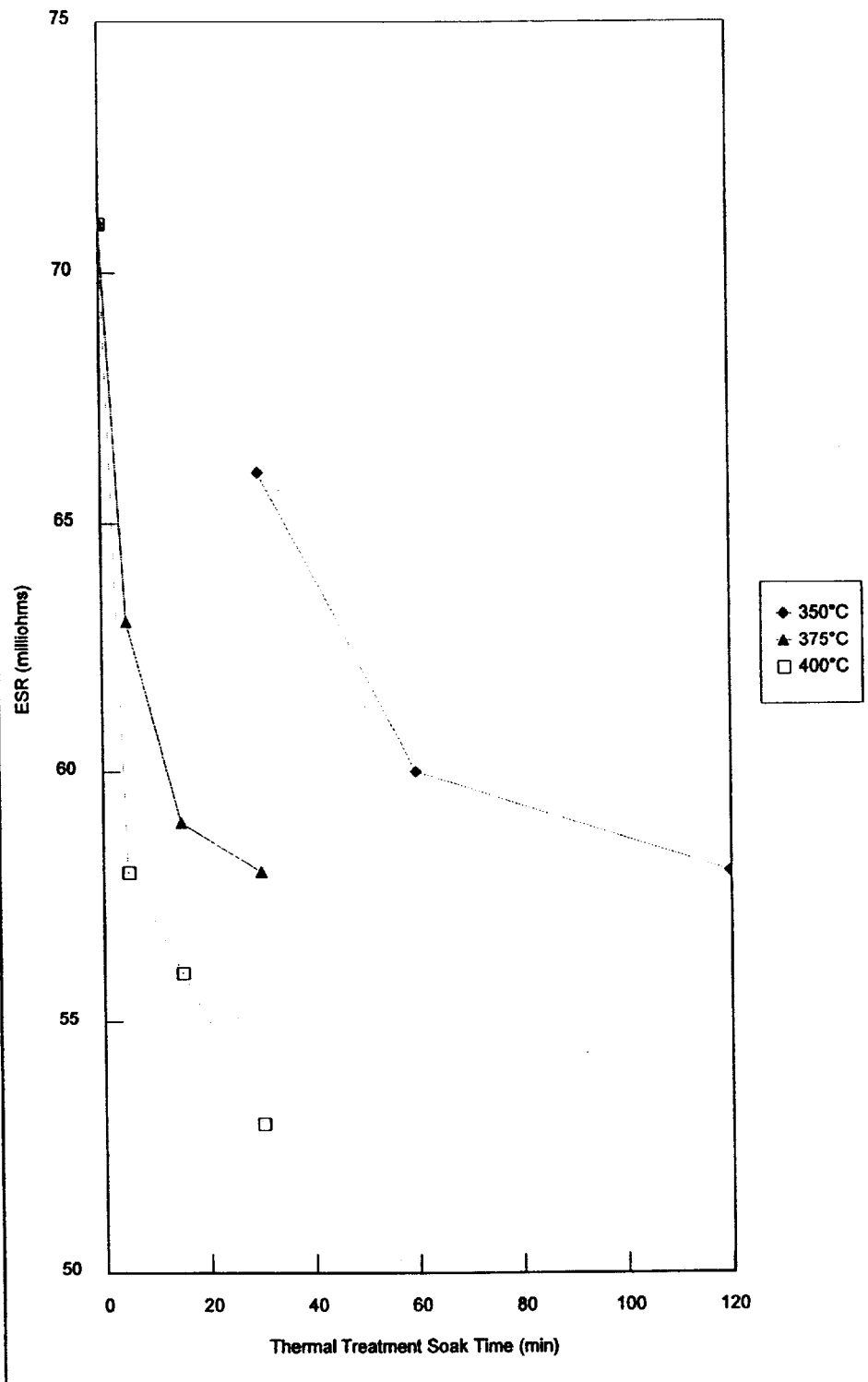
FIG. 3 illustrates the ESR performance of 100 $\mu F$ 10 volt anodes pressed from C410 Ta powder exposed to a wide range of thermal treatment time-temperature combinations.

A series of thermal treatments was run to determine the effect of time and temperature on the ESR of the treated capacitor. Surface mount 100 $\mu$F 10 volt anodes pressed from Cabot C410 Ta powder were used in this test. The test groups were exposed to a ramped thermal treatment as described in Example 2. The thermal treatment temperature and soak time were varied. ESR results are plotted in FIG. 3.

Example 4 (Comparative)

Figure 4:
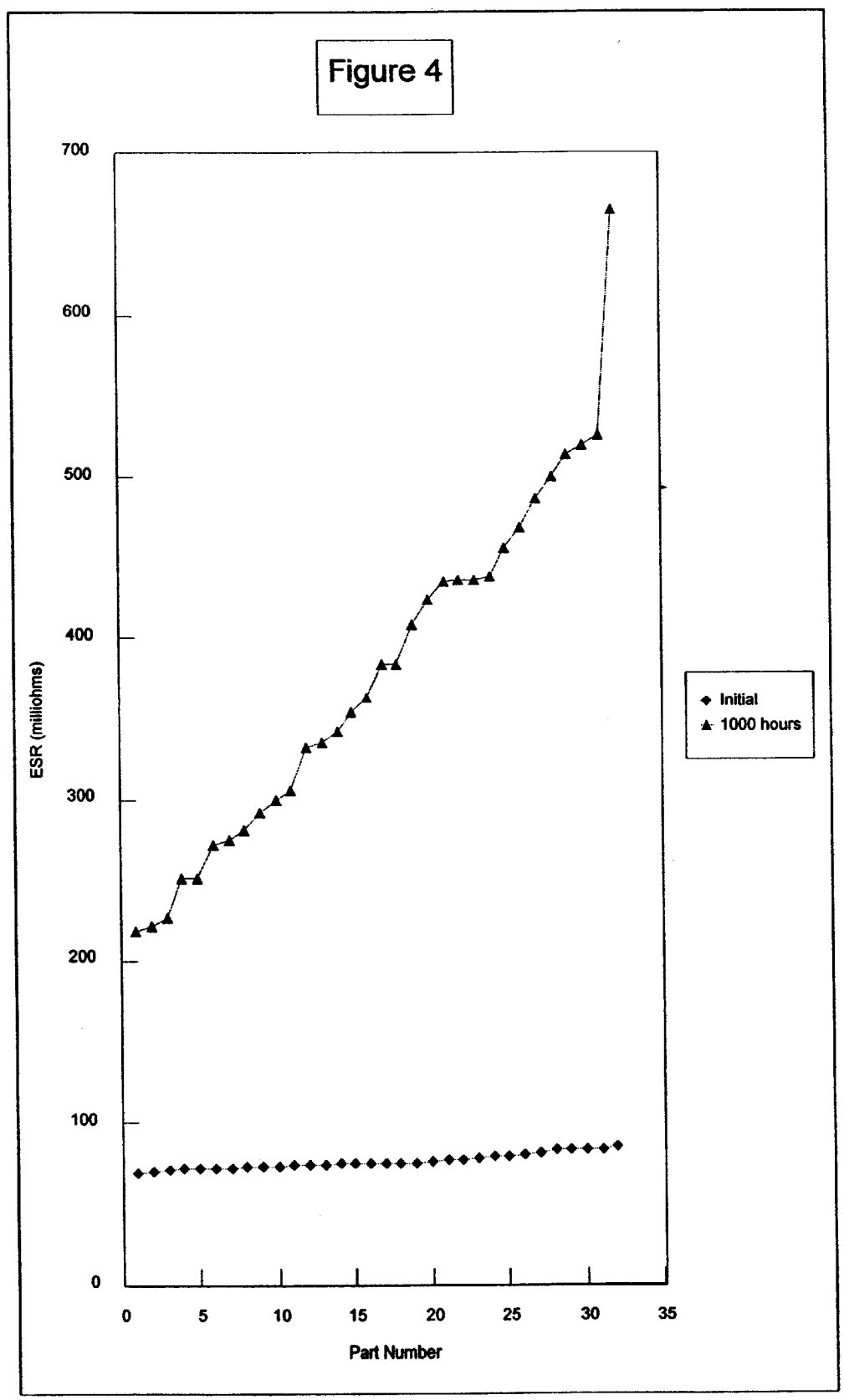
FIG. 4 illustrates the ESR of a control group of 100 $\mu F$ 10 volt anodes before and after exposure to 85% relative humidity at 85° C. for 1000 hours. The ESR performance of the corresponding test group is illustrated in FIG. 5.
Figure 5:
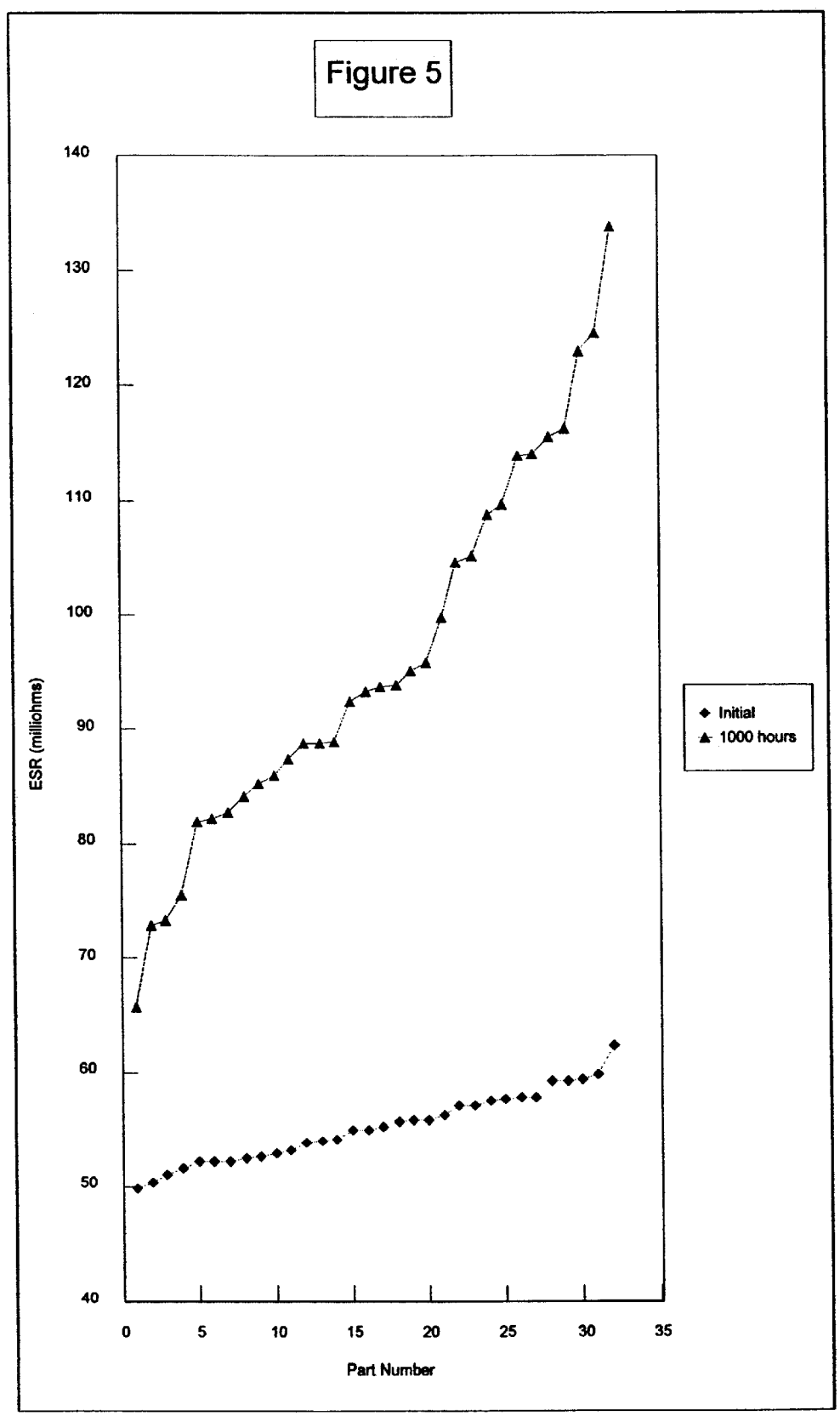
FIG. 5 illustrates the initial and post test ESR of a test group of 100 $\mu F$ 10 volt anodes following exposure to 85% relative humidity at 85° C. for 1000 hours. The test group was split from the control group of anodes illustrated in FIG. 4 and was processed with a 400° C. 30 minute thermal treatment.

Many 100 $\mu$F 10 volt anodes pressed from Cabot C410 Ta powder were processed through the final manganous nitrate impregnation and pyrolysis sequence using procedures common in the industry. The lot was split to create test and control anode lots. The test group of anodes was processed with a 400° C./30 minute ramped thermal treatment as described in Example 2. The two groups were processed to produce non-hermetic surface mount capacitors. Representative samples from test and control groups were exposed to 85% relative humidity at 85° C. with no applied voltage. ESR was measured following 1000 hours exposure to this test environment. The initial and 1000 hour ESR data for the control group of anodes are plotted in FIG. 4. The initial and 1000 hour ESR data for the test group anodes are depicted in FIG. 5.

Although the thermal treatment process of Examples 1–4 produced a reproducible and stable reduction in device ESR via conversion of gamma- and epsilon-manganese dioxide (produced during the manganous nitrate pyrolysis process) into the more electronically conductive beta form of manganese dioxide, the process is not as useful as is desirable due to the relatively high temperatures required.

Example 5 (Inventive)

Tantalum nitride powder (H. C. Starck Corporation, Newton, Mass.) was pressed into anodes, each anode having an embedded tantalum riser wire. The anodes were then sintered at a temperature of 1700° C. for a period of 20 minutes. The anodes were found to release a substantial amount of nitrogen between 1300° C. and 1400° C. (resulting in formation of the subnitride as described by Tripp et. al.).

It was discovered that the tantalum riser wires became somewhat hardened and embrittled by the presence of the large amount of nitrogen in the furnace at 1300–1400° C. This may be overcome by pressing the anode bodies without riser wires, sintering the anode bodies, and then welding the riser wires to the anode bodies, with or without a post wire-attachment sintering step.

The anodes were welded to carrier bars to facilitate processing and divided into several groups and processed as follows:

Group 1 (Control Group)

Anodized to 20 volts and processed conventionally through manganese dioxide, carbon, and silver paint application to yield 100 MFD /6 volt-rated capacitors ready for encapsulation.

Group 2 (Thermally Treated)

Anodized to 20 volts and processed conventionally through manganese dioxide application. Prior to the last "reform" step, these anodes received a thermal treatment of 400° C. for 30 minutes, ramped as described in Example 2. The final "reform" step was then carried out and the anodes were processed conventionally through carbon and silver paint application.

One process bar (37 devices) from each group was tested to measure the electrical parameters of the devices. Both bars of anodes were then subjected to a burn-in at 1.3 times the rated voltage (RV)/85° C. for 15.5 hours. The electrical parameters of each bar were then re-measured after the burn-in step.

The test, burn-in, and re-test process was then repeated with an additional bar of capacitors from each 6 volt group, above. The thermal treatment process step of the present invention resulted in an ESR reduction of approximately 35% and a df reduction of approximately 44% with no degradation of the leakage current, neither before nor after the burn-in step. In fact, the leakage current was lower in the devices of the present invention. The test results are presented in Tables 1 and 2.

TABLE 1

| 1st Test | | Cap @120 Hz | DF @120 Hz | ESR @100 KHz | DCL @RV |
|---|---|---|---|---|---|
| control | before burn-in Mean | 108.26 | 6.64 | 0.251 | 2.1087 |
| control | after burn-in Mean | 107.07 | 6.30 | 0.249 | 0.4145 |
| thermal treatment | before burn-in Mean | 96.22 | 3.65 | 0.160 | 1.1754 |
| thermal treatment | after burn-in Mean | 96.68 | 3.69 | 0.160 | 0.4011 |

TABLE 2

| 2nd Test | | Cap @120 Hz | DF @120 Hz | ESR @100 KHz | DCL @RV |
|---|---|---|---|---|---|
| control | before burn-in Mean | 108.28 | 6.62 | 0.251 | 2.3856 |
| control | after burn-in Mean | 107.24 | 6.21 | 0.248 | 0.4580 |
| thermal treatment | before burn-in Mean | 96.84 | 3.44 | 0.163 | 1.1985 |
| thermal treatment | after burn-in Mean | 97.40 | 3.53 | 0.162 | 0.3345 |

Group 3 (Control Group)

Anodized to 60 volts and processed conventionally through manganese dioxide, carbon, and silver paint application to yield 27 MFD/16 volt-rated capacitors ready for encapsulation.

Group 4 (Thermally Treated)

Anodized to 60 volts and processed conventionally through manganese dioxide application. Prior to the last "reform" step, these anodes received a thermal treatment of 400° C. for 30 minutes, ramped as described in Example 2. The final "reform" step was then carried out and the anodes were processed conventionally through carbon and silver paint application.

One process bar (37 devices) from each group was then tested to measure the electrical parameters of the devices. Both bars of anodes were then subjected to a burn-in at 1.3 times the rated voltage (RV) 85° C. for 15.5 hours. The electrical parameters of each bar were then re-measured after the bum-in step. The test, burn-in, and re-test process was then repeated with an additional bar of capacitors from each 16 volt group, above. The thermal treatment process step of the present invention has led to a significant reduction in device ESR and df. The ESR was reduced by over 45% and the df was reduced by over 65%. The test results are presented in Tables 3 and 4.

TABLE 3

| 1st Test | | Cap @120 Hz | DF @120 Hz | ESR @100 KHz | DCL @RV |
|---|---|---|---|---|---|
| control | before burn-in Mean | 28.05 | 5.08 | 0.455 | 3.2474 |
| control | after burn-in Mean | 28.34 | 5.29 | 0.420 | 0.3330 |
| thermal treatment | before burn-in Mean | 26.76 | 1.61 | 0.235 | 1.5374 |
| thermal treatment | after burn-in Mean | 26.97 | 1.65 | 0.238 | 0.1177 |

TABLE 4

| 2nd Test | | Cap @120 Hz | DF @120 Hz | ESR @100 KHz | DCL @RV |
|---|---|---|---|---|---|
| control | before burn-in Mean | 29.87 | 5.60 | 0.452 | 3.5097 |
| control | after burn-in Mean | 30.26 | 5.29 | 0.442 | 0.2524 |
| thermal treatment | before burn-in Mean | 27.00 | 1.63 | 0.232 | 3.0079 |
| thermal treatment | after burn-in Mean | 27.04 | 1.64 | 0.230 | 0.1239 |

The leakage current exhibited by 16 volt-rated tantalum nitride anodes processed through the thermal treatment step of the present invention, both before and after a burn-in step, is lower than that of control anodes not processed through the thermal treatment step. This is in stark contrast to the results obtained with 16 volt-rated tantalum anodes (anodized to similar voltage), which tend to exhibit very high leakage current or short-circuit behavior when subjected to the thermal treatment of the present invention.

The combination of the thermal treatment step with the oxygen diffusion resistance associated with the anodes fabricated from valve metal nitrides makes possible the thermal treatment process for reducing device ESR/df without increasing device leakage current.

Clearly, the complete absence of leakage current performance degradation at 16 volts for the tantalum nitride anodes processed through the thermal treatment process suggests that it is applicable to higher voltage ratings as well. In fact, there is no obvious upper limit to the device voltage to which the process may be applied so long as the substrate has the oxygen diffusion resistance associated with tantalum nitride.

Additionally, the work of Tripp, et. al. strongly suggests that other valve metal nitrides fabricated into manganese dioxide coated "solid" electrolytic capacitor anodes, should be capable of withstanding the thermal treatment process of the present invention (for the purpose of reducing device ESR/df) without an unacceptably large degradation of leakage current performance. The utility of the thermal treatment process of the present invention is not limited to tantalum nitride but may be extended to all valve metal nitrides and sub-nitrides which exhibit suitable oxygen diffusion resistance and resulting anodic oxide film stability.

In summary, the combination of manganese dioxide-coated, anodized valve metal nitride porous anodes with a thermal treatment step, preferably ramped, at a sufficiently high temperature, is sufficient to convert non-beta, pyrolytic manganese dioxide to the beta crystal form. This makes possible a dramatic reduction in device ESR and df without the need to employ more exotic and difficult to control means of producing more conductive pyrolytic manganese dioxide such as doping the manganous nitrate solution and/or oven atmosphere with nitric acid or ozone, or maintaining the pyrolysis oven temperature greatly in excess of the 225–275° C. in common use in the industry with anodes fabricated from high surface area valve metal powders (e.g., 350–450° C.).

What is claimed is:

1. An electrolytic capacitor comprising a thermally treated anode prepared by heating a manganese dioxide coated porous anodized valve metal nitride anode to a temperature of about 325° C. to about 450° C.

2. The capacitor of claim 1 wherein the valve metal nitride anode is a tantalum nitride anode.

3. The capacitor of claim 1 wherein the manganese dioxide coated porous valve metal nitride anode is coated on both the internal and external surfaces of the porous anode.

4. An electrolytic capacitor comprising a thermally treated anode prepared by heating a manganese dioxide coated porous anodized valve metal nitride anode to a first temperature of about 200° C. to about 250° C. for a time sufficient for the valve metal nitride anode to reach thermal equilibrium, and then increasing the temperature to a second temperature of about 325° C. to about 450° C.

5. The capacitor of claim 4 wherein the valve metal nitride anode is a tantalum nitride anode.

6. The capacitor of claim 4 further comprising reducing the second temperature from about 200 to about 250° C. for a time sufficient to reduce thermal shock of the anode.

7. An electrolytic capacitor comprising a thermally treated anode prepared by impregnating a porous anodized valve metal nitride anode with an aqueous manganous nitrate solution; heating to a first temperature sufficient to cause pyrolytic decomposition of the manganous nitrate; repeating the impregnating and the heating to provide a manganese dioxide coated porous anodized valve metal nitride anode; and heating the coated porous anodized valve metal nitride anode to a second temperature of about 325° C. to about 450° C. to produce a thermally treated anode.

8. The capacitor of claim 7 wherein in the first temperature sufficient to cause pyrolytic decomposition is about 130° C. to about 270° C.

9. The capacitor of claim 7 wherein the manganese dioxide coated porous anodized valve metal nitride anode is heated to the second temperature and from about 15 seconds to about 24 hours.

10. The capacitor of claim 7 wherein the manganese dioxide coated porous anodized valve metal nitride anode is coated on both the internal and external surfaces of the porous anode.

11. The capacitor of claim 7 further comprising initially heating the manganese dioxide coated anodized porous valve metal nitride anode to a temperature of about 200° C. to about 250° C. for a time sufficient for the anode to reach thermal equilibrium, and then increasing the temperature to the second temperature.

12. The capacitor of claim 11 further comprising reducing the temperature from the second temperature to a temperature of about 200 to about 250° C. for a time sufficient to reduce thermal shock of the anode.

13. The capacitor of claim 7 wherein the valve metal nitride anode is a tantalum nitride anode.

14. The capacitor of claim 1 wherein the temperature is about 375° C. to about 400 °C.

15. The capacitor of claim 4 wherein the second temperature is about 375° C. to about 400° C.

16. The capacitor of claim 7 wherein the second temperature is about 375° C. to about 400° C.

* * * * *